United States Patent Office 2,804,370
Patented Aug. 27, 1957

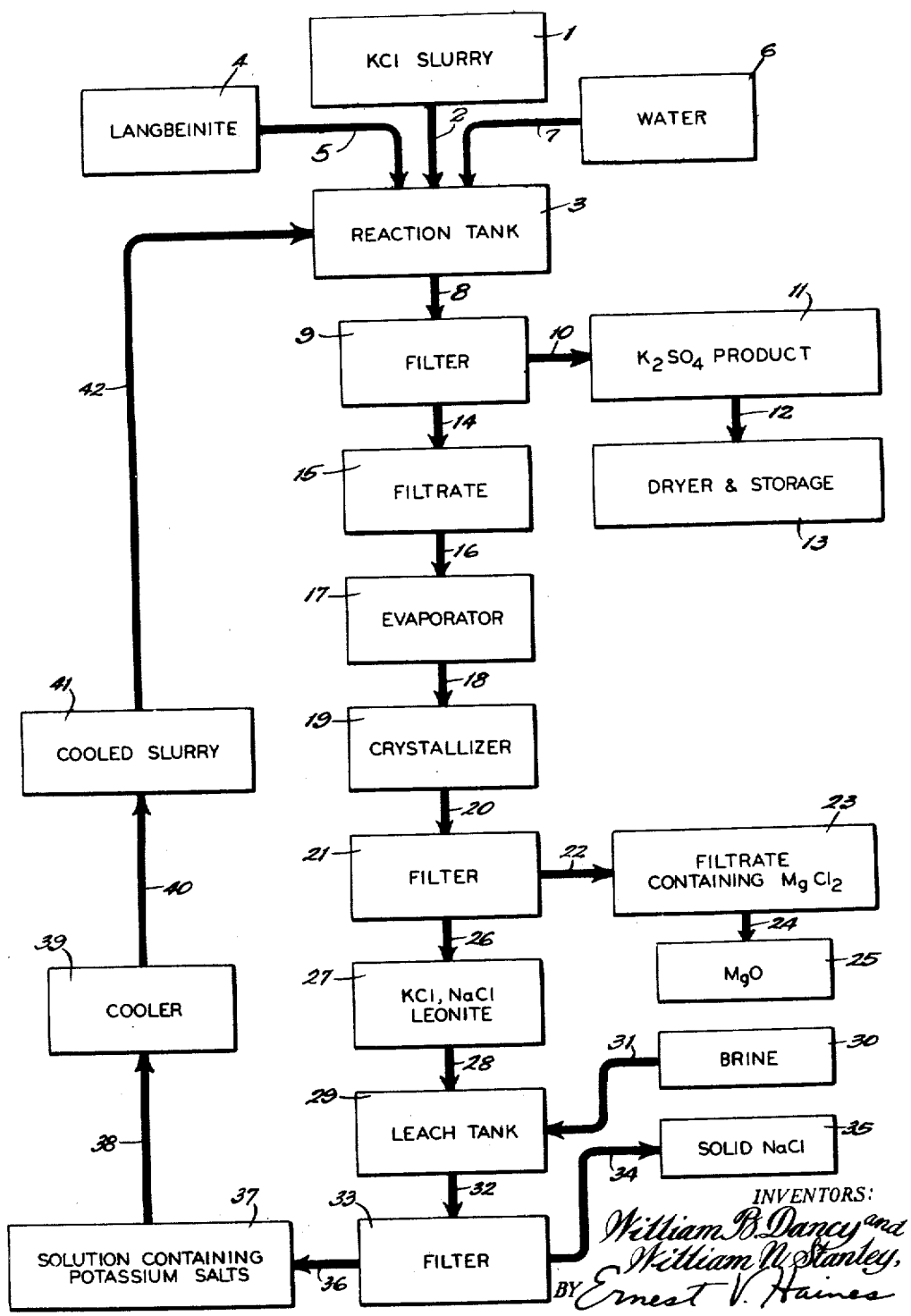

2,804,370

PRODUCTION OF GLASERITE FROM LANGBEINITE

William B. Dancy and William N. Stanley, Carlsbad, N. Mex., assignors to International Minerals & Chemical Corporation, a corporation of New York Application September 17, 1953, Serial No. 380,708

9 Claims. (Cl. 23—38)

The instant invention relates to processes for the production of a potassium sulfate containing product. More particularly, the instant invention relates to processes for the production from langbeinite ore of a low grade potassium sulfate which is a suitable fertilizer constituent.

Certain phosphatic fertilizers are manufactured from phosphate rock by acidulating the rock with nitric acid, and then reacting the calcium nitrate, which has been formed, with sulfuric acid and potassium chloride. Potassium sulfate can be used instead of sulfuric acid and potassium chloride for this reaction of the calcium nitrate. However, potassium sulfate has not been available at a cost which is competitive with sulfuric acid and potassium chloride. If a potassium sulfate product suitable for use in such phosphatic fertilizers could be produced at low cost to become competitive with or cheaper than sulfuric acid and potassium chloride, the potassium sulfate would replace these compounds and at the same time supply the $K_2O$ content desired in certain fertilizers.

It is an object of the instant invention to provide processes for the production of a low grade potassium sulfate.

It is a further object of the instant invention to provide processes for the production of a potassium sulfate product suitable for use in fertilizer manufacture.

It is a further object of the instant invention to provide commercially feasible processes for the production of a low grade potassium sulfate from langbeinite ore and from brines from the potash industry.

It is a further object of the instant invention to efficiently recover potash values from various low grade potassium chloride containing-brines which also contain large quantities of sodium chloride.

These and other objects of the instant invention will become more apparent upon a fuller understanding of the instant invention as hereinafter described.

A potassium sulfate product suitable for certain industrial purposes, such as use in fertilizer manufactured from nitric acid-acidulated phosphate rock and use in fertilizers which have a low chloride content, is prepared from langbeinite ($K_2SO_4.2MgSO_4$), from brines from the potash industry or other aqueous solutions substantially saturated with sodium chloride and with potassium chloride, and from potassium chloride or recycled potassium salts recovered from the mother liquor of the product. The brines are obtained by leaching with water, ores such as sylvinite or langbeinite, or tailings containing sodium chloride and potassium chloride from flotation or other beneficiation operations.

Although in initiating the process potassium chloride is used in the reaction mixture with the langbeinite and the brine, a slurry of recycled potassium salts, recovered from the mother liquor of the product, are preferably present in the langbeinite reaction mixture and is employed instead of the solid potassium chloride and brine once the process has been initiated. Potassium values present in the mother liquor from which the potassium sulfate product is separated are recovered as a mixture of leonite ($K_2SO_4.MgSO_4.4H_2O$) and potassium chloride contaminated with relatively large quantities of sodium chloride. The sodium chloride, if not at least partially separated from the potash salts, would pass through the system and would ultimately be recovered with the potassium sulfate product as a chloride contaminant. Sodium chloride is separated from the potassium salts to be recycled by leaching the potash salts from the mixture with incoming brine or solution saturated with respect to potassium chloride and sodium chloride at an elevated temperature and separating the undissolved sodium chloride from the potash enriched brine. The enriched brine is mixed with langbeinite ore to form low grade potassium sulfate product as the salt glaserite ($Na_2SO_4.3K_2SO_4$).

The process is initiated by admixing solid langbeinite and potassium chloride with an aqueous solution or brine which is substantially saturated with respect to potassium chloride and to sodium chloride. A low grade potassium sulfate product is crystallized and separated from the mixture. The reaction proceeds according to the following equation:

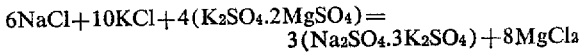

$$6NaCl+10KCl+4(K_2SO_4.2MgSO_4)= 3(Na_2SO_4.3K_2SO_4)+8MgCl_2$$

However, this equation or theory of reaction is not to be understood as a limitation of the instant novel process.

The resulting mother liquor from which the product has been separated will contain dissolved salts comprising magnesium chloride, potassium chloride, sodium chloride, and magnesium sulfate. This mother liquor is concentrated to a point, so that on cooling, the liquor approaches saturation with respect to the magnesium chloride salt carnallite. A salt mixture composed of leonite, potassium chloride, and sodium chloride crystallizes after evaporation and cooling of the mother liquor and is separated from the cooled solution. Potassium chloride and leonite which contain potassium values are recovered from the salt mixture by rapidly leaching the mixture of salts at an elevated temperature, for example a temperature between about 60° C. and about 100° C. with a brine. Solid sodium chloride is immediately separated from the hot solution. The leaching step is carried out under conditions in which the leonite will supersaturate the leach solution, rather than react to form insoluble glaserite. The system is not allowed to reach equilibrium, because if equilibrium is reached, leonite reacts to form solid glaserite which would be separated with the solid sodium chloride and would result in substantial loss in $K_2O$ recovery. The solid sodium chloride is separated from the hot leach solution, for example by filtration, before an appreciable quantity of glaserite forms.

The leach solution containing dissolved leonite and potassium chloride is cooled and the slurry is preferably recycled to the langbeinite reaction step. The recycled potassium salts have a $K_2O$ content of about 23%. By the term "recycled salts" as used in the description and claims is meant the mixture of potassium chloride, leonite, and sodium chloride from which a large amount of the sodium chloride has been separated by the leaching step. In order to obtain optimum production per unit of langbeinite raw material processed, it is desirable to recycle substantially all of the mixture of recycled salts.

In carrying out a preferred embodiment of the process, the salt mixture containing leonite, potassium chloride and sodium chloride recovered by evaporation and cooling of the mother liquor from which the product has been separated is admixed with a brine substantially saturated with respect to potassium chloride and to sodium chloride at a temperature between about 25° C. and about 35° C. The brine is prepared by leaching langbeinite ore, sylvinite ore, or tailings from the flotation of sylvinite ore. The resulting slurry is rapidly heated to a temperature between about 80° C. and about 95° C., and solid phase sodium chloride is immediately separated from the hot solution, for example by filtration. The resulting solution which is saturated with potassium chloride and sodium chloride is cooled to a temperature between about 25° C. and about 60° C., preferably between about 30° C. and about 55° C., and the resulting slurry is admixed with ground langbeinite.

Other potassium chloride salts than the recycled salt mixture from the evaporation of the mother liquor can also be employed in the same manner to produce the brine saturated with potassium chloride and sodium chloride at a temperature between about 80° C. and about 95° C. For example, sylvinite ore or tailings from the flotation of sylvinite ore and other sources of potassium chloride are suitable, but the recycled salt mixture from the evaporation and the cooling of the glaserite mother liquor is preferably employed.

Sufficient water is added to the langbeinite reaction mixture to reduce the sodium chloride concentration below its saturation point in the mixture of products resulting from the reaction. Sufficient dilution is necessary, because as the reaction of the langbeinite proceeds, magnesium chloride is formed, and as the concentration of magnesium chloride in the mixture increases, the solubility of sodium chloride in the solution decreases. Generally, the reaction mixture contains between about 4.0 and about 5.0 parts of water per part of langbeinite.

The langbeinite reaction mixture is agitated or stirred until the reaction has proceeded to substantial completion. Generally, between about 4 hours and about 6 hours is sufficient time for substantial completion of the reaction. Potassium sulfate salt, as glaserite, is separated from the mother liquor, for example by filtration. Sodium sulfate is the chief impurity present in the potassium sulfate product which contains between about 40% and about 42% $K_2O$ content. Sodium sulfate does not impair the usefulness of this product in fertilizers, for example those produced by nitric acid acidulation of phosphate rock.

The mother liquor from which the product is separated is concentrated, for example by evaporating at a temperature between about 60° C. and about 108° C. The mother liquor is concentrated to such point that when the concentrated liquor is cooled over a range of between about 35° C. and about 50° C., for example to a temperature of between about 25° C. and about 60° C., leonite, potassium chloride and sodium chloride are crystallized from the slurry. In a preferred embodiment, the liquor is concentrated at about 98° C. in a submerged combustion evaporator to a magnesium chloride concentration between about 15% and about 18%. The concentrated liquor is cooled to about 50° C., and the mixture of salts comprising potassium chloride, sodium chloride and leonite which crystallize from the cooled slurry are separated from the liquor, for example by filtration or as an underflow in a conventional thickener apparatus. The liquor from which the solids have been separated has about the same composition as mother liquors rejected from conventional processes in which potassium sulfate is prepared by base exchange. This liquor is processed for the recovery of magnesium values in accordance with known methods for treating potassium sulfate reject liquors.

The mixture of salts separated from the mother liquor is rapidly leached at an elevated temperature, preferably between about 90° C. and about 95° C., with a brine substantially saturated with respect to potassium chloride and to sodium chloride at a temperature between about 25° C. and about 35° C. Potassium chloride and leonite are dissolved from the mixture of solids. Solid sodium chloride is immediately separated from the hot solution containing the potassium values, for example by filtration. The sodium chloride is generally rejected from the process. The solution, containing the dissolved leonite and potassium chloride, is cooled to a temperature between about 25° C. and about 60° C., preferably between about 40° C. and about 50° C., and is recycled to the langbeinite reaction step.

For a more complete understanding of the instant novel process reference may be had to the figure which is a flow sheet of the process.

An aqueous slurry 1 the solid phase of which is potassium chloride and the liquid phase saturated with respect to potassium chloride and to sodium chloride is conducted to reaction tank 3 by means of line 2. Solid langbeinite 4 enters the reaction tank 3 by means of line 5 and water 6 is conveyed to the same by line 7. The mixture is agitated at a temperature between about 45° C. and about 55° C. until the reaction proceeds to substantial completion, that is about 6 hours. Thereafter, the reacted mixture is transferred to filter 9 by means of line 8, and the potassium sulfate product 11 is conveyed to drier and storage 13 by means of line 12.

The mother liquor or filtrate 15 is removed from filter 9 by means of line 14 and is conducted to evaporator 17, maintained at about 98° C., by means of line 16. The concentrated filtrate is transferred by line 18 to crystallizer 19 where it is cooled to about 50° C. The resulting slurry is conveyed to filter 21 by line 20 where solids 27 comprising sodium chloride, potassium chloride and leonite are separated and removed by line 28. The filtrate 23 which contains magnesium chloride is removed by line 22 and is conducted by line 24 to a magnesium oxide processing unit 25. The solids 27 are conducted by means of line 28 to a leach tank 29 where they are mixed with brine 30, conducted to the tank 29 by line 31. The solids are rapidly leached at about 90° C., and the resulting hot slurry is immediately transferred by means of line 32 to filter 33 where a hot solution 37 is removed by means of line 36. Solid sodium chloride 35 is separated and removed from filter 33 by line 34. The solution containing dissolved potassium salts 37 is conducted by means of line 38 to cooler 39. A slurry 41 containing solid phase potassium chloride is removed from cooler 39 by means of line 40 and is recycled by means of line 42 to the reaction tank.

The following examples are presented in order to afford a clearer understanding of the practice of the instant invention, but it is to be distinctly understood that these examples are illustrative only and that there is no intention to limit the invention thereto.

*Example I*

The process was initiated by admixing about 64.16 pounds of langbeinite, about 31.12 pounds of potassium chloride, about 207.40 pounds of brine saturated with respect to potassium chloride and to sodium chloride, and about 59.68 pounds water. This reaction mixture was agitated at between about 40° C. and about 60° C. for about 6 hours. About 63.6 pounds of glaserite was separated from the reaction products by filtration and was dried. The filtrate, weighing about 298.76 pounds was evaporated at about 98° C. to a point near saturation with respect to carnallite. A mixture of salts comprising leonite, potassium chloride, and sodium chloride crystallized from the concentrated liquor upon cooling to a temperature between about 40° C. and about 50° C. Sodium chloride was separated from the mixture of salts, and the potassium salts were recycled to the langbeinite reaction as described in Example III.

*Example II*

About 207.40 pounds brine saturated with respect to potassium chloride and to sodium chloride, and about 115.66 pounds sylvinite ore were admixed and rapidly heated to about 90° C. Solid sodium chloride was separated from the hot solution by filtration, and the filtrate was cooled to between about 40° C. and about 50° C. About 238.52 pounds of the cooled filtrate was admixed with about 64.16 pounds langbeinite and about 59.68 pounds water, and the resulting recation mixture was agitated at between about 40° C. and about 60° C. for about 6 hours. About 63.60 pounds glaserite was separated from the reaction products by filtration and was dried. About 298.76 pounds of filtrate was evaporated at about 98° C. to a point near saturation with respect to carnallite, and the concentrated liquor was cooled to about 40° C. A mixture of salts comprising leonite, potassium chloride, and sodium chloride crystallized from the cooled liquor. Sodium chloride was separated from the salt mixture, and the potassium salts were recycled to the langbeinite reaction as described in Example III.

*Example III*

About 70 pounds of a salt mixture recovered from evaporation and cooling glaserite mother liquor, containing about 28% by weight potassium chloride and about 20% by weight leonite, the remainder being sodium chloride and adhering liquor, was mixed with about 300 pounds of a brine saturated wtih respect to potassium chloride and sodium chloride at about 30° C. The mixture was rapidly heated to about 90° C. and immediately filtered. About 46 pounds of wet filter cake was obtained which contained about 1% potassium chloride, the remainer being sodium chloride and adhering brine. These salts were rejected. The filtrate, about 286 pounds, was cooled to about 40° C. The resulting 286 pounds of slurry were mixed with about 48 pounds of ground langbeinite and 23 pounds of water. This reaction mixture was agitated at between about 40° C. and about 60° C. for about 6 hours. Glaserite was separated from the reaction products by filtration and was dried. The filtrate was evaporated at about 98° C. to about 66% of its original weight, and the concentrated slurry was cooled to about 50° C. Salts which crystallized were separated by filtration. About 70 pounds of salts were obtained, which were recycled to the hot leaching step.

Having thus fully described and illustrated the character of the invention, what is desired to be secured and claimed by Letters Patent is:

1. A process for the production of glaserite which comprises reacting solid langbeinite with an aqueous slurry, the liquid phase of which is saturated with respect to sodium chloride and to potassium chloride and the solid phase comprising essentially potassium chloride, at a temperature between about 25° C. and about 60° C. to produce glaserite, separating solid glaserite from the mother liquor after the reaction has proceeded to substantial completion, crystallizing a mixture of salts comprising leonite, potassium chloride, and sodium chloride from the glaserite mother liquor, admixing said salts with sufficient hot aqueous solution substantially saturated with respect to sodium chloride to dissolve the potassium chloride and leonite from the salt mixture, separating solid sodium chloride from the hot solution, cooling the resulting solution to a temperature between about 25° C. and about 60° C., and returning at least a portion of the resulting slurry to the langbeinite reaction step.

2. A process for the production of glaserite which comprises reacting solid langbeinite with an aqueous slurry, the liquid phase of which is saturated with respect to sodium chloride and to potassium chloride and the solid phase comprising essentially potassium chloride, at a temperature between about 25° C. and about 60° C. to produce glaserite, separating solid glaserite from the mother liquor after the reaction has proceeded to substantial completion, concentrating the mother liquor to such a point that upon cooling a mixture of salts comprising potassium chloride, sodium chloride and leonite crystallizes therefrom, cooling the concentrated liquor, separating a mixture of crystallized salts comprising potassium chloride, sodium chloride and leonite from the cooled liquor, admixing said salts with sufficient hot aqueous solution substantially saturated with respect to sodium chloride to dissolve the potassium chloride and leonite from the salt mixture, separating solid sodium chloride from the hot solution, cooling the resulting solution to a temperature between about 25° C. and about 60° C., and returning at least a portion of the resulting slurry to the langbeinite reaction step.

3. A process for the production of glaserite which comprises admixing solid langbeinite with an aqueous slurry, the liquid phase of which is saturated with respect to sodium chloride and to potassium chloride and the solid phase comprising essentially potassium chloride, and with sufficient water to keep the sodium chloride in solution, at a temperature between about 25° C. and about 60° C. to produce glaserite, separating solid glaserite from the mother liquor after the reaction has proceeded to substantial completion, concentrating the mother liquor to such point that upon cooling a salt mixture comprising potassium chloride, sodium chloride and leonite crystallize from the liquor, cooling the concentrated solution, separating said salt mixture from the cooled liquor, admixing the salt mixture with brine substantially saturated with respect to sodium chloride and potassium chloride, heating the resulting slurry to a temperature between about 80° C. and about 95° C., separating solid sodium chloride from the hot solution, cooling the resulting solution to a temperature between about 30° C. and about 55° C., and returning at least a portion of the resulting slurry to the langbeinite reaction step.

4. A process for the production of glaserite which comprises preparing a solution which is saturated with respect to potassium chloride and to sodium chloride at a temperature between about 80° C. and about 95° C., cooling said solution to a temperature between about 30° C. and about 55° C., reacting the cooled mixture with langbeinite in the presence of sufficient water to keep the sodium chloride in solution, separating glaserite from the mother liquor after the reaction has proceeded to substantial completion, crystallizing a mixture of salts comprising leonite, potassium chloride and sodium chloride from the mother liquor, leaching potassium chloride and leonite from the mixture of salts at a temperature between about 80° C. and about 95° C. with an aqueous solution substantially saturated with respect to sodium chloride, separating solid sodium chloride from the hot solution containing dissolved leonite and potassium chloride, cooling said solution to a temperature between about 30° C. and about 55° C., and recycling the resulting cooled slurry to the langbeinite reaction step.

5. A process for the production of glaserite which comprises preparing a solution which is substantially saturated with respect to potassium chloride and to sodium chloride at a temperature between about 80° C. and about 95° C., cooling said solution to a temperature between about 30° C., and about 55° C., adding sufficient water to the cooled mixture to keep sodium chloride in solution, admixing the diluted slurry with langbeinite, stirring the resulting mixture for between about 4 hours and about 6 hours, separating glaserite from the mother liquor, crystallizing a mixture of salts comprising leonite, potassium chloride and sodium chloride from the mixture of salts, admixing said mixture of salts with an aqueous solution substantially saturated with respect to sodium chloride and to potassium chloride, heating the resulting slurry to a temperature between about 80° C. and about 95° C., immediately separating solid sodium chloride from the hot solution containing dissolved leonite and potassium chloride, cooling said solution to a temperature between about 30° C. and about 55° C., and recycling the cooled slurry to the langbeinite reaction step.

6. A process which comprises concentrating a glaserite mother liquor containing dissolved sodium, potassium, magnesium, sulfate, and chloride salts at a temperature between 60° C. and about 108° C. to such point that upon cooling a mixture of salts comprising leonite ($K_2SO_4 \cdot MgSO_4 \cdot 4H_2O$), potassium chloride, and sodium chloride crystallize, cooling the concentrated liquor, separating said salt mixture from the cooled liquor, mixing said salt mixture with an aqueous brine substantially saturated with respect to sodium chloride and to potassium chloride, heating the resulting slurry to a temperature between about 80° C. and about 95° C., separating solid sodium chloride from the hot solution, cooling the resulting solution to a temperature between about 25° C. and about 60° C., whereby an aqueous slurry is obtained comprising solid potassium chloride suspended in an aqueous solution substantially saturated with sodium chloride and potassium chloride, reacting the cooled slurry with solid langbeinite, and separating solid glaserite from the mother liquor after the reaction has proceeded to substantial completion.

7. A process which comprises concentrating at a temperature between about 60° C. and 100° C. a glaserite mother liquor containing dissolved sodium, potassium, magnesium, sulfate, and chloride salts at a temperature between 60° C. and about 108° C. to such a point that upon cooling the concentrated liquor to a temperature between about 30° C. and about 55° C. a mixture of salts comprising leonite, potassium chloride and sodium chloride crystallizes, so cooling said concentrated liquor, whereby a salt mixture comprising leonite $$(K_2SO_4.MgSO_4.4H_2O)$$

potassium chloride and sodium chloride crystallizes from the cooled liquor, separating said salt mixture therefrom, admixing said salt mixture with an aqueous brine substantially saturated with respect to potassium chloride and to sodium chloride at a temperature between about 25° C. and about 30° C., heating the resulting slurry to a temperature between about 80° C. and about 95° C., separating solid sodium chloride from the hot solution, cooling the resulting solution to a temperature between about 30° C. and about 55° C., whereby an aqueous slurry is obtained comprising solid potassium chloride suspended in an aqueous solution substantially saturated with sodium chloride and potassium chloride, admixing the cooled slurry with langbeinite and sufficient water to keep sodium chloride in solution in the resulting reaction products, and separating glaserite from the resulting reaction products after the reaction has proceeded to substantial completion.

8. A process for the production of glaserite which comprises admixing sylvinite ore with brine substantially saturated with respect to sodium chloride and to potassium chloride, heating the resulting slurry to a temperature between about 80° C. and about 95° C., separating solid sodium chloride from the hot solution, cooling the resulting solution to a temperature between about 30° C. and about 55° C., whereby an aqueous slurry is obtained comprising solid potassium chloride suspended in an aqueous solution substantially saturated with sodium chloride and potassium chloride, reacting the cooled slurry with solid langbeinite in the presence of sufficient water to keep the sodium chloride in solution, and separating solid glaserite from the resulting reaction products after the reaction has proceeded to substantial completion.

9. A process for the production of glaserite which comprises preparing an aqueous solution substantially saturated with respect to potassium chloride and to sodium chloride at a temperature between about 20° C. and about 40° C., adding thereto a mixture of salts comprising leonite, potassium chloride, and sodium chloride obtained by crystallization from a concentrated glaserite mother liquor as set forth hereinafter, heating the resulting slurry to a temperature between about 80° C. and about 95° C., separating solid sodium chloride from the hot solution, cooling said solution to a temperature between about 30° C. and about 55° C., whereby an aqueous slurry is obtained comprising solid potassium chloride suspended in an aqueous solution substantially saturated with sodium chloride and potassium chloride, reacting the cooled slurry with langbeinite, separating the glaserite which forms from the mother liquor after the reaction has proceeded to substantial completion, concentrating the mother liquor at a temperature between about 60° C. and 108° C. to such point that upon cooling a mixture of salts comprising leonite, potassium chloride and sodium chloride crystallize, cooling the concentrated liquor, separating the crystallized salts from the cooled liquor, and recycling at least a portion of the crystallized salts to said aqueous solution substantially saturated with respect to potassium chloride and to sodium chloride.

References Cited in the file of this patent

UNITED STATES PATENTS

| 1,936,070 | Ritchie | Nov. 21, 1933 |
| 1,990,896 | Connell | Feb. 12, 1935 |
| 2,295,257 | Britt | Sept. 8, 1942 |
| 2,684,285 | Dancy | July 20, 1954 |
| 2,689,041 | Dancy | Sept. 14, 1954 |

FOREIGN PATENTS

| 464,040 | Great Britain | Apr. 12, 1937 |

OTHER REFERENCES

International Critical Tables, McGraw-Hill Book Co., Inc., New York, 1928, vol. IV, pages 282, 283, 383

Mellor: "Comprehensive Treatise on Inorganic and Theoretical Chemistry." Longmans Green, New York, 1922, vol. 2, pages 671, 672.

UNITED STATES PATENT OFFICE
CERTIFICATE OF CORRECTION

Patent No. 2,804,370

August 27, 1957

William B. Dancy et al.

It is hereby certified that error appears in the printed specification of the above numbered patent requiring correction and that the said Letters Patent should read as corrected below.

Column 7, lines 19 and 20, claim 7, strike out "at a temperature between 60° C. and about 108° C.".

Signed and sealed this 12th day of November 1957.

(SEAL)
Attest:

KARL H. AXLINE
Attesting Officer

ROBERT C. WATSON
Commissioner of Patents